United States Patent [19]
Rose

[11] 3,894,240
[45] July 8, 1975

[54] CONTROL CIRCUIT FOR MAINTAINING A MOVABLE MEDIUM BETWEEN LIMITS

[75] Inventor: Ronald N. Rose, Lake Worth, Palm Beach, Fla.

[73] Assignee: Simer Pump Company, Minneapolis, Minn.

[22] Filed: Mar. 22, 1974

[21] Appl. No.: 454,020

[52] U.S. Cl. ................ 250/577; 250/206; 315/156; 340/244 C
[51] Int. Cl. ......................................... H01j 39/12
[58] Field of Search .................. 250/577, 222, 206; 356/135–137; 315/156–159; 340/244 C, 244 R

[56] References Cited
UNITED STATES PATENTS

| | | | |
|---|---|---|---|
| 3,389,261 | 6/1968 | Hart | 250/206 |
| 3,485,262 | 12/1969 | Perren | 250/577 X |
| 3,573,467 | 4/1971 | Vasel | 250/206 |
| 3,596,673 | 8/1971 | Laucournet | 250/577 X |

Primary Examiner—Walter Stolwein
Attorney, Agent, or Firm—Neil B. Schulte

[57] ABSTRACT

A control circuit for maintaining any medium between two predetermined limits as for example the water level in a container. High and low limit probes in the medium are connected through carefully chosen resistances to a neon lamp. Although the low limit probe does not conduct enough current to ignite the neon lamp, when both probes become activated by the medium sufficient current does flow to ignite the lamp. If the level drops below the high limit probe the current still flowing due to the lower probe remaining active is enough to maintain the lamp ignited. When the level drops below the lower limit probe the current stops or drops low enough so that the lamp is extinguished. Suitable means are included in the control circuit to monitor the state of the neon lamp and control the power to a pump, a motor, or other device so as to maintain the level between the high and low limit probes.

5 Claims, 3 Drawing Figures

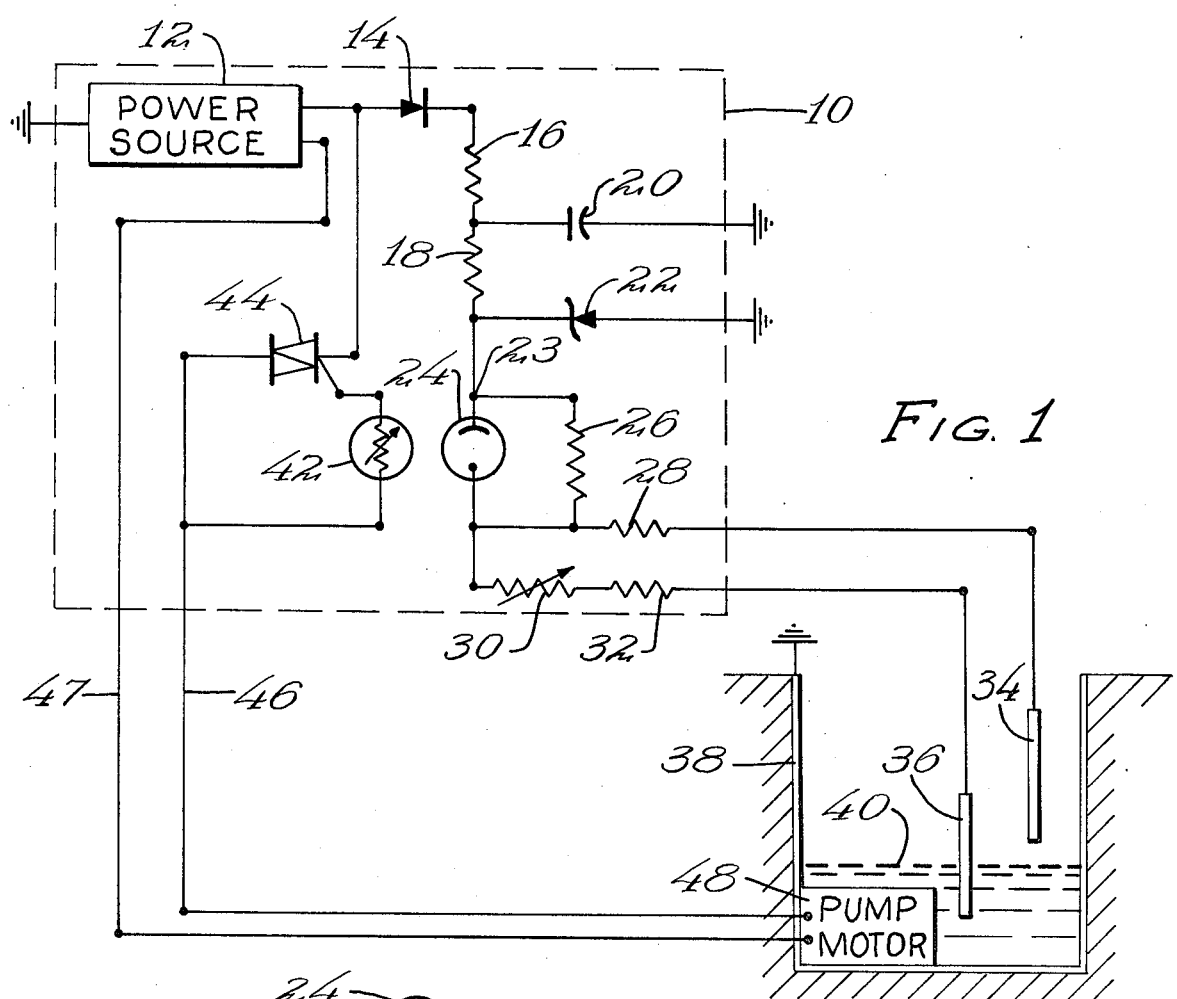
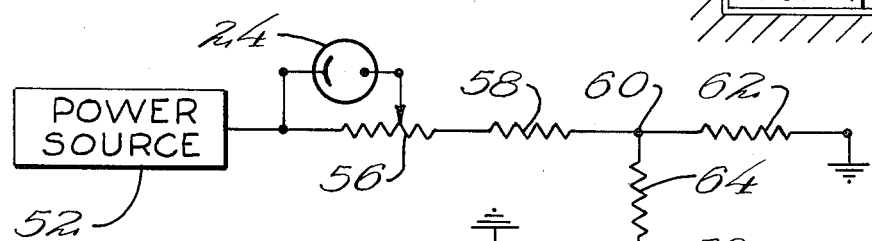
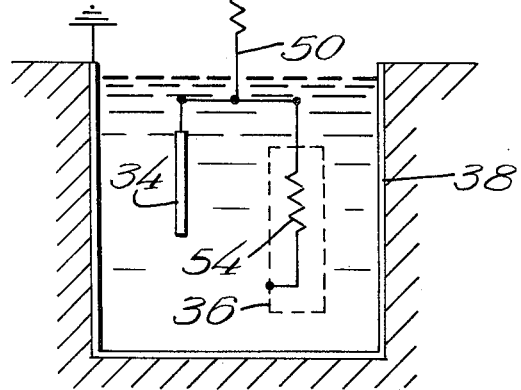
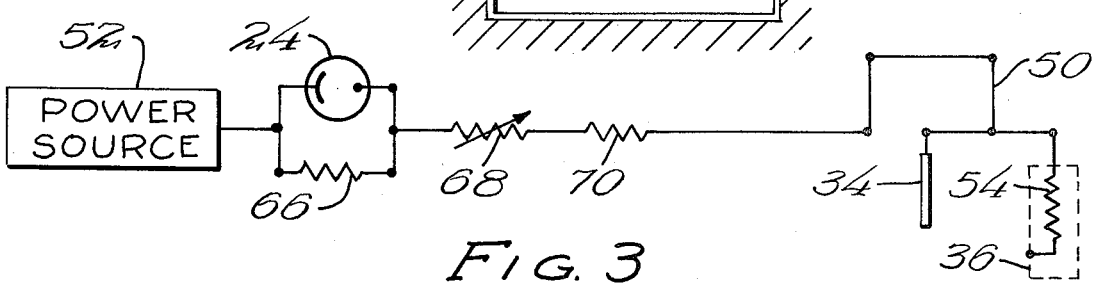
FIG. 1
FIG. 2
FIG. 3

CONTROL CIRCUIT FOR MAINTAINING A MOVABLE MEDIUM BETWEEN LIMITS

BACKGROUND OF THE INVENTION

The present invention has utility for a number of different control functions including various types of liquid level control, opening and closing garage doors, maintaining light levels within predetermined limits, and any other system where upper and lower limits can be detected by suitable probes. For the purpose of this application, however, the invention is described with respect to a sump pump and in particular, to maintaining the liquid level in a sump. This embodiment is chosen so that the operation of the invention may be more clearly understood. It is not intended that the invention should be limited to sump pumps, however, since a wide variety of control functions may be performed by the switching circuit described herein.

In the prior art many different types of control circuits have been utilized to maintain a certain medium within predetermined limits. These devices usually involve complicated electro-mechanical switches which are troublesome and require much maintainance. It is more desirable to use simple electrical switches or probes which detect contact with the fluid or medium at its two predetermined limits, but the circuitry necessary to utilize such probes can also be complicated. The present invention avoids these problems by the unique use of a neon lamp as a switching element thus producing a novel control circuit having wide utility and the utmost simplicity and reliability.

SUMMARY OF THE INVENTION

Briefly, the control circuit of my invention contemplates the use of a neon lamp connected to two probes which, for the purposes of this application, are referred to as the upper limit and lower limit probes. Resistances are connected between the upper limit and lower limit probes and the neon lamp so that the flow of current therethrough is dependent upon whether or not one or more of the limit probes is in contact with the grounded fluid in the sump. Although contact with the lower limit probe allows sufficient current flow to maintain the lamp burning if it is already ignited, it does not produce sufficient current flow to ignite the lamp. If the fluid level rises so as to contact and thereby ground both the lower limit and the upper limit probe then the combined current flow through these two probes and their respective resistances is sufficient to ignite the lamp. The net result is that when the fluid contacts the upper probe the lamp is ignited which condition can be sensed either by a photoelectric cell or by a suitable electronic monitoring means. The sensing of the neon lamp burning is used to turn on a sump pump motor so as to reduce the fluid level. The lamp remains lighted even after the fluid level drops below the upper limit probe since the current flow through the lower limit probe is sufficient to maintain the lamp burning. Consequently, the pump motor continues to operate in response to the means detecting the burning condition of the lamp. When the fluid is finally reduced to the point where it goes below the lower limit probe, current flow through the lamp ceases entirely, thus, extinguishing the lamp and causing the monitoring means to turn off the pump motor. It can be seen that the fluid remains between the limits which are physically established by the position of the lower and upper limit probes. In this way the level of the sump water can be maintained as accurately as desired.

It is immediately apparent that the circuit of my invention can be connected to control the limits of any fluid or any other measurable medium. It is only necessary that the probes be sensitive to two predetermined limits within which it is desired to maintain some medium. It, therefore, may be seen that it is an object of my invention to provide a control circuit for maintaining any desired medium between predetermined limits. A further object of my invention is to provide a control circuit which utilizes the conductive characteristics of a neon lamp to provide a switching function for maintaining a medium between predetermined limits. Further objects and advantages will become apparent from the following description and drawings.

BRIEF DESCRIPTION OF THE DRAWINGS

FIG. 1 is a schematic diagram of one embodiment of my invention showing how it operates and in particular demonstrating how it may be applied to a sump pump type of installation.

FIGS. 2 and 3 are schematic diagrams showing two other possible circuits for connecting the neon lamp to the limit probes.

DESCRIPTION OF THE PREFERRED EMBODIMENT

Referring to FIG. 1 it may be seen that the control circuit of my invention is indicated generally within a dashed box 10. A power source 12 supplies current through a supply voltage rectifier diode 14. This rectified voltage is presented to a point 23 through a surge limiting resistor 16 and a voltage dropping resistor 18. A capacitor 20 removes any ripple remaining in the current supply from power source 12. A diode 22 operates as a shunt voltage regulator to insure a constant 110 volts at junction 23. Diodes 14 and 22, resistors 16 and 18, and capacitor 20 together comprise a simple, low cost, half wave, filtered and regulated power supply to supply 110 volts DC at point 23 so that a neon lamp 24 can be operated therefrom.

Neon lamp 24 is connected to a pair of probes 34 and 36 in parallel with a resistor 26 to produce a voltage divider circuit. A fixed resistor 28 connects the parallel combination of resistor 26 and neon lamp 24 to the upper limit probe 34. A second fixed resistor 32 in series with a variable resistor 30 connects the combination of resistor 26 and lamp 24 to the lower limit probe 36. Variable resistor 30 permits compensation for any variation in the firing voltage of neon lamp 24.

The electrical characteristics of neon lamps are such that they require certain minimum voltages before ionization occurs in the bulb and current flows. However, once the current has begun, a lower voltage suffices to keep the lamp ignited. Resistances 30 and 32 are chosen such that when the fluid level 40 in sump 38 contacts lower limit probe 36 the flow of current from power source 12 across resistor 26 and into the grounded sump 38 is not sufficient to produce a voltage drop across lamp 24 that causes ignition. As the fluid rises further, however, and contacts upper limit probe 34 as well, the additional current flow through resistors 26 and 28 causes a voltage to be produced across lamp 24 sufficient to ignite lamp 24.

The ignition of lamp 24 is sensed, in the embodiment shown in FIG. 1, by means of a photo electric detector 42. This detector may comprise a photo cell or any other light detecting means. Dectector 42 is connected to a bilaterial solid state relay 44 which is used to gate current from power source 12 through a pair of lines 46 and 47 to a pump motor 48. Consequently, as soon as the fluid level reaches the upper limit probe 34, lamp 24 ignites and this condition is utilized by detector 42 to turn on pump motor 48 and reduce the fluid level. It will be evident that the fluid level is immediately pumped below the upper limit probe 34. Since the flow of current is now established through lamp 24, a lesser voltage, namely that produced by the flow through lower limit probe 36, is sufficient to keep the lamp ignited. Once, however, the level of the fluid 40 is lowered to the point where it no longer contacts, the lower limit probe 36, lamp 24 turns off. The cessation of light is detected by detector 42 which shuts off relay 44 and the pump motor 48.

In the embodiment shown in FIG. 1 relay 44 is controlled by a photo cell 42. When lamp 24 ignites, the resistance of photo cell 42 is greatly reduced, thus satisfying the gate requirements of solid state relay 44 which may comprise, for example, a triac.

In FIG. 2 a second circuit is shown wherein only a single wire 50 into the sump is required. Lower limit probe 36 is shown by a dashed line in FIG. 2 and includes a built in resistance 54. Consequently, both limit probe 36 and upper limit probe 34 can be connected in parallel to the single wire 50. The flow of current from a supply 52 passes through both the neon lamp 24 and an adjustable parallel resistance 56 and thence through a resistance 58 to point 60. From point 60 the current can flow to ground through parallel paths comprising a resistor 62 in the other direction. Since the current always flows to ground through resistor 62 the voltage across lamp 24 can be very accurately controlled with variable resistance 56. As before, the additional current flow through resistances 64 and 54 when limit probe 36 becomes immersed is enough to sustain lamp 24 but not ignite it. When the fluid reaches limit probe 34, however, the additional current direct to ground through resistor 64 will develop sufficient voltage across lamp 24 to ignite it.

In FIG. 3 yet another possible circuit is shown. The current from supply 52 flows through lamp 24 and a parallel resistance 66 to a variable resistor 68, a resistance 70, and thence to the limit probes. The current flow is adjusted by variable resistor 68 so as to establish a voltage across lamp 24. Although this circuit is simpler and less expensive then that of FIG. 2 it is less controllable.

I claim:

1. A control circuit for maintaining a movable medium between predetermined limits comprising:
    upper and lower limit probes operable to detect the presence of said medium at the upper and lower limits respectively;
    a power source;
    a light source means requiring a higher ignition current than sustaining current connected to said power source and to said upper and lower limit probes;
    voltage means controlled by the current flowing to said probes, said light source means requiring current flow through both probes to ignite but through only one probe to remain on;
    means for detecting if the light source means is burning; and
    medium control means connected to said detecting means so as to vary said medium responsive to the state of said light source means.

2. The apparatus of claim 1 in which said means for detecting comprises a photo detector.

3. The apparatus of claim 1 in which said light source means is connected in parallel with a first resistance comprising said voltage means, the combination thereof connected in series between said power source and said limit probes.

4. The apparatus of claim 3 and in which said combination is also connected to ground through a resistance to form a parallel path with the probes.

5. The apparatus of claim 4 in which said means for detecting comprises a photo detector.

* * * * *